(12) United States Patent
Uchida et al.

(10) Patent No.: US 9,435,487 B2
(45) Date of Patent: Sep. 6, 2016

(54) HIGH PRESSURE TANK

(71) Applicant: TOYOTA JIDOSHA KABUSHIKI KAISHA, Toyota-shi, Aichi-ken (JP)

(72) Inventors: Yu Uchida, Toyota (JP); Masayoshi Takami, Hamamatsu (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/802,230

(22) Filed: Jul. 17, 2015

(65) Prior Publication Data

US 2016/0076700 A1  Mar. 17, 2016

(30) Foreign Application Priority Data

Sep. 17, 2014  (JP) ................. 2014-188816

(51) Int. Cl.
*F17C 1/16* (2006.01)
*F17C 1/04* (2006.01)

(52) U.S. Cl.
CPC ............. *F17C 1/04* (2013.01); *F17C 2201/01* (2013.01); *F17C 2203/0604* (2013.01); *F17C 2203/0619* (2013.01); *F17C 2203/0634* (2013.01); *F17C 2205/03* (2013.01); *F17C 2260/01* (2013.01)

(58) Field of Classification Search
CPC ..... F17C 1/16; F17C 1/02; F17C 2201/0109
USPC .......................... 220/586, 588, 592, 643, 644
See application file for complete search history.

(56) References Cited

U.S. PATENT DOCUMENTS 8,448,808 B2 * 5/2013 Tani .......................... F17C 1/16
                                                             220/586

FOREIGN PATENT DOCUMENTS

JP      2013-167298    8/2013
JP      2013-228082    11/2013

* cited by examiner

*Primary Examiner* — Steven A. Reynolds
*Assistant Examiner* — King M Chu
(74) *Attorney, Agent, or Firm* — Finnegan, Henderson, Farabow, Garrett & Dunner, LLP (57) ABSTRACT

The high pressure tank comprises a tank main body including a liner made of a resin and a mouthpiece made of a non-resin material and mounted to an open end of the liner; and a reinforcement layer provided to cover the entire tank main body and have pressure resistance. The liner includes a first contact surface arranged approximately perpendicular to a central axis of the liner to come into contact with the mouthpiece. The mouthpiece includes a second contact surface arranged to come into contact with the first contact surface of the liner. One of the first contact surface and the second contact surface includes projections, and the other includes recesses in which the projections being fitted. The second contact surface is formed in an approximately circular shape.

12 Claims, 10 Drawing Sheets

HIGH PRESSURE TANK

The present invention relates to a tank.

BACKGROUND

A high pressure tank equipped with a mouthpiece made of a metal, an inner shell (hereinafter called "liner") made of a resin and an outer shell (hereinafter called "reinforcement layer") made of a fiber-reinforced resin has been known as a tank filled with a high pressure fluid such as hydrogen gas. The mouthpiece is a member serving as an opening to fill the fluid into the high pressure tank or release the fluid contained in the high pressure tank and is provided on an open end of the high pressure tank.

A known technique employed to manufacture the high pressure tank is filament winding method (hereinafter referred to as "FW method"). The FW method winds reinforced fibers impregnated with a thermosetting resin such as an epoxy resin on the outer surface of a tank main body that is the liner equipped with the mouthpiece and then thermally cures the thermosetting resin included in the reinforced fibers, so as to form the reinforcement layer.

The FW method generally winds the reinforced fibers on the tank main body, while the tank main body held in a rotatable manner is rotated in the circumferential direction of the tank main body. The tank main body is rotated with the mouthpiece of the tank main body fixed to an FW device. In this process, the mouthpiece may rotate idly to prevent the reinforced fibers impregnated with the thermosetting resin from being adequately wound on the outer surface of the tank main body.

One proposed technique forms a mouthpiece in a serrate shape to suppress idle rotation of the mouthpiece (see, for example, Japanese Patent Publication No. 2013-167298A).

The internal pressure of the high pressure tank is varied in use. The liner made of the resin and the mouthpiece made of the metal have different expansion coefficients. Accordingly, a variation in internal pressure of the tank is likely to apply a stress to the reinforcement layer on the boundary between the mouthpiece and the liner and cause distortion in the reinforcement layer, due to the difference in expansion coefficient between the mouthpiece and the liner. In the technique disclosed in JP 2013-167298A, the mouthpiece is formed in the serrate shape and has a longer boundary between the mouthpiece and the liner compared with a mouthpiece formed in a circular shape. In this configuration, a variation in internal pressure of the high pressure tank is likely to cause distortion at a number of different positions in the reinforcement layer. Forming the mouthing in a simple circular shape is, however, likely to cause idle rotation of the mouthpiece as mentioned above.

SUMMARY

In order to solve at least part of the problems described above, the invention may be implemented by the following aspects.

(1) According to one aspect of the invention, a high pressure tank is provided. This high pressure tank may comprise a tank main body including a liner made of a resin and a mouthpiece made of a non-resin material and mounted to an open end of the liner; and a reinforcement layer provided to cover the entire tank main body and have pressure resistance. The liner may include a first contact surface arranged approximately perpendicular to a central axis of the liner to come into contact with the mouthpiece. The mouthpiece may include a second contact surface arranged to come into contact with the first contact surface of the liner. One of the first contact surface and the second contact surface may include projections, and the other may include recesses in which the projections being fitted. The second contact surface may be formed in an approximately circular shape.

In the high pressure tank of this aspect, one of the liner and the mouthpiece has the projections provided on the contact surface that is approximately perpendicular to the central axis of the liner (i.e., the central axis of the high pressure tank), while the other has the recesses arranged to receive the corresponding projections fit therein. Fitting the projections in the recesses suppresses idle rotation of the liner or the mouthpiece even when a torque is induced by the rotation of the high pressure tank about the central axis and is applied to the high pressure tank. Accordingly, in the process of forming a reinforcement layer on the outer surface of the liner and the mouthpiece by, for example, FW method, this configuration suppresses idle rotation of the mouthpiece even when a large torque is applied to the mouthpiece. This configuration provides a shorter boundary between the liner and the mouthpiece, compared with a mouthpiece having a second contact surface in, for example, a splined shape, a serrate shape or a polygonal shape. Accordingly, this configuration suppresses distortion of the reinforcement layer at a number of different positions even when a variation in internal pressure of the high pressure tank applies a stress to the reinforcement element due to a difference in expansion coefficient between the mouthpiece and the liner.

(2) In the high pressure tank of the above aspect, the projections may be formed radially about a central axis of the high pressure tank as a center. This configuration causes the projections to be arranged perpendicularly to a torque induced by the rotation of the high pressure tank and thus more effectively suppresses idle rotation of the liner or the mouthpiece.

(3) In the high pressure tank of the above aspect, the projections may be formed on the first contact surface of the liner. This configuration facilitates manufacture, compared with the configuration of forming projections on the second contact surface of the mouthpiece.

(4) In the high pressure tank of the above aspect, the first contact surface and the second contact surface may respectively include a first engagement element and a second engagement element configured to be engaged with each other and suppress separation between the mouthpiece and the liner. This configuration suppresses separation between the mouthpiece and the liner and thereby further suppresses idle rotation of the liner or the mouthpiece.

(5) In the high pressure tank of the above aspect, the first engagement element and the second engagement element may be formed in an approximately circular shape in plan view to be placed on an outer circumferential side of the projections. This configuration ensures uniform and sufficient engagement between the outer peripheries of the contact surfaces of the mouthpiece and the liner and thus more effectively suppresses idle rotation of the mouthpiece.

The invention may be implemented by any of various other aspects, for example, a fuel cell system including a high pressure tank and a moving body with such a fuel cell system mounted thereon.

DESCRIPTION OF EMBODIMENTS

A. First Embodiment

A1. Structure of High Pressure Tank

Figure 1:
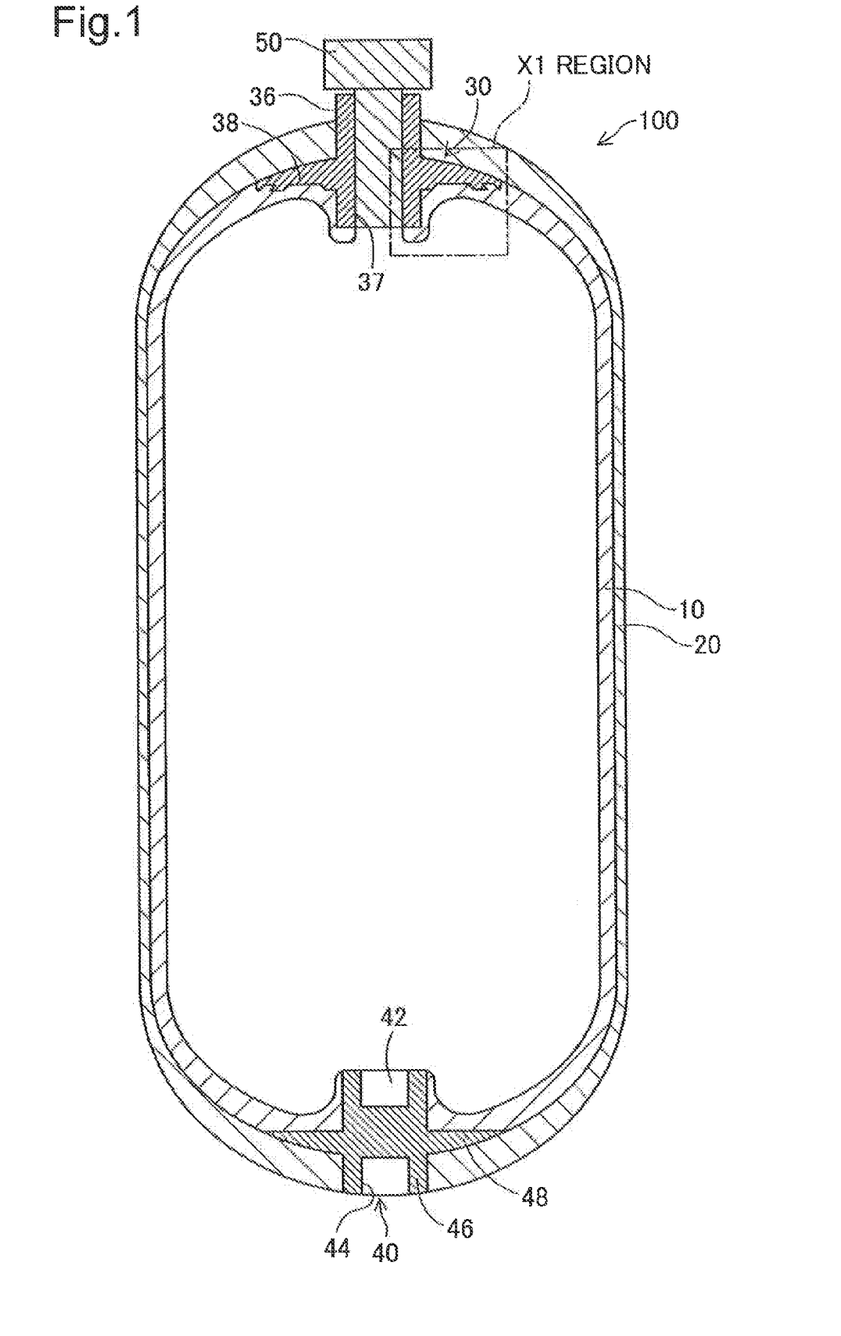
FIG. 1 is a sectional view illustrating the schematic configuration of a high pressure tank according to a first embodiment of the invention.

FIG. 1 is a sectional view illustrating the schematic configuration of a high pressure tank 100 according to a first embodiment of the invention. In this embodiment, the high pressure tank 100 is filled with, for example, compressed hydrogen. The high-pressure tank 100 filled with compressed hydrogen is mounted on a fuel cell vehicle to supply hydrogen to a fuel cell.

As shown in FIG. 1, the high pressure tank 100 is formed in an approximately cylindrical shape having the diameter-reduced curved surfaces at both ends and includes a liner 10, a reinforcement layer 20, a mouthpiece 30, another mouthpiece 40 and a valve 50. The liner 10 equipped with the mouthpieces 30 and 40 is hereinafter also called "tank main body 60".

The liner 10 is made of a nylon resin that is capable of preventing, for example, hydrogen contained in the internal space from leaking outside.

The mouthpiece 30 is mounted to one open end of the liner 10. The mouthpiece 30 is made of aluminum and serves as an opening of the high pressure tank 100 and also as a mounting structure used to mount a piping or the valve 50 to the tank main body 60. The mouthpiece 30 also serves as a mounting structure used to mount the tank main body 60 to a filament winding device (hereinafter also called "FW device") described later. As illustrated, the mouthpiece 30 includes a cylindrical body 36 in an approximately cylindrical shape and a flange portion 38 approximately perpendicular to the cylindrical body 36. The detailed structure of the mouthpiece 30 will be described later.

The mouthpiece 40 is mounted to the other open end of the liner 10. The mouthpiece 40 is made of aluminum, is mounted such as to be partly exposed outside, and serves as a heat conductor to conduct the heat inside of the tank to outside. The mouthpiece 40 also serves as a mounting structure used to mount the tank main body 60 to the FW device. As illustrated, the mouthpiece 40 includes a columnar body 46 in a columnar shape having substantially the same diameter as that of the cylindrical body 36 of the mouthpiece 30, and a flange portion 48 that has substantially the same diameter as that of the flange portion 38 of the mouthpiece 30 and is approximately perpendicular to the columnar body 46. The columnar body 46 includes a first hole 42 and a second hole 44 formed to mount the tank main body 60 to the FW device.

The reinforcement layer 20 is formed to cover the entire tank main body 60. The configuration of "covering the entire tank main body" may cover at least the entire outer surface of the liner and cover over the boundary between the liner and the mouthpiece and includes the configuration that part of the mouthpiece is not covered by the reinforcement layer but is exposed. More specifically, the reinforcement layer 20 is formed to cover the entire outer surface of the liner 10, the entire outer surface of the flange portion 38 of the mouthpiece 30, part of the outer surface of the cylindrical body 36 of the mouthpiece 30 and the outer surface of the mouthpiece 40. The reinforcement layer 20 is made of CFRP (carbon fiber reinforced plastic) as a type of fiber reinforced plastic and has pressure resistance. According to this embodiment, the reinforcement layer 20 is formed by FW method. More specifically, the reinforcement layer 20 is formed by winding carbon fibers impregnated with an epoxy resin on the periphery of the tank main body 60 used as a mandrel by a predetermined number of windings and subsequently curing the epoxy resin.

The valve 50 has male threads (not shown) formed on its columnar portion. The valve 50 closes the opening of the mouthpiece 30 by screwing the male threads of the valve 50 to female threads (not shown) formed on an inner surface of the cylindrical body 36 of the mouthpiece 30.

Figure 2:
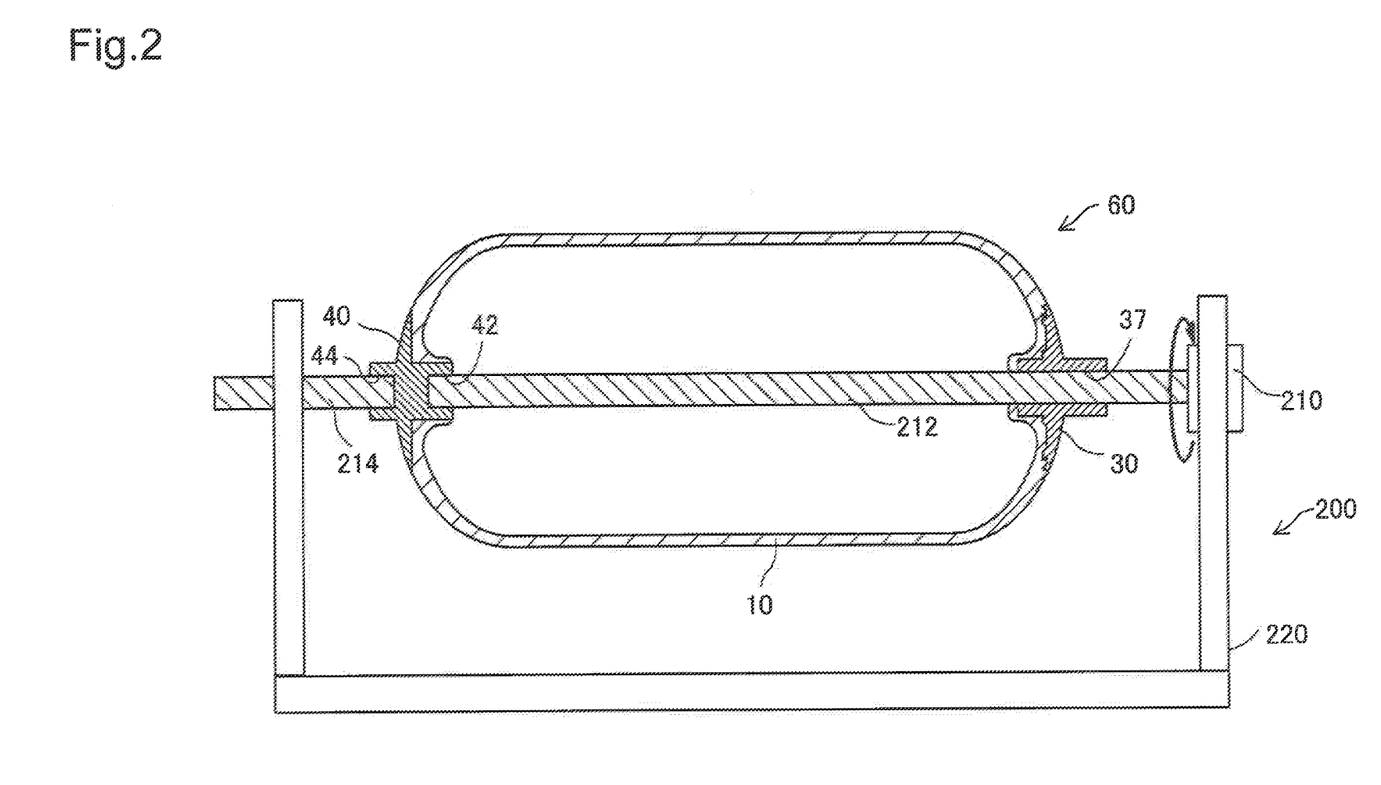
FIG. 2 is a diagram illustrating the state that a tank main body is mounted to an FW device.

FIG. 2 is a diagram illustrating the state that the tank main body 60 is mounted to an FW device 200. The FW device 200 is used to wind carbon fibers impregnated with an epoxy resin (hereinafter may be simply called "carbon fibers") on the outer periphery of the tank main body 60, while rotating the tank main body 60 in a cylindrical direction of the liner 10. The FW device 200 mainly includes a support base 220, a motor 210, a first rotating shaft 212, a second rotating shaft 214 and a fiber drawing assembly (not shown).

The first and the second rotating shafts 212 and 214 serve as support shafts to hold the tank main body 60 such as to be rotatable about its central axis in the FW device 200. In the process of mounting the tank main body 60, the first rotating shaft 212 is inserted from a through hole 37 of the mouthpiece 30 along the central axis of the tank main body 60 into a hollow part of the tank main body 60, and an axial end of the first rotating shaft 212 is fit in the first hole 42 of the mouthpiece 40. The first rotating shaft 212 has male threads (not shown) formed to be screwed to female threads (not shown) formed in the through hole 37. The first rotating shaft 212 accordingly fixes the mouthpiece 30 and seals the through hole 37 of the mouthpiece 30 air-tightly. The second rotating shaft 214 is, on the other hand, placed outside of the tank main body 60 to have its central axis aligned with the central axis of the tank main body 60, and an axial end of the second rotating shaft 214 is fit in the second hole 44 of the mouthpiece 40.

The first and the second rotating shafts 212 and 214 are respectively supported by the support base 220. The first rotating shaft 212 is connected with a motor 210 and is rotated with rotation of the motor 210. The mouthpiece 30 fixed to the first rotating shaft 212 is rotated with rotation of the first rotating shaft 212, so that the entire tank main body 60 is rotated. As shown by an arrow in FIG. 2, the rotation of the first rotating shaft 212 and the tank main body 60 applies a rotation-induced torque to the tank main body 60.

While the tank main body 60 is rotated at a substantially constant speed by controlling the rotation of this motor 210, the carbon fibers are supplied from the fiber drawing assembly to be wound on the entire outer periphery of the tank main body 60 by, for example, hoop winding or helical winding.

A1-1. Structure of Tank Main Body

Figure 3:
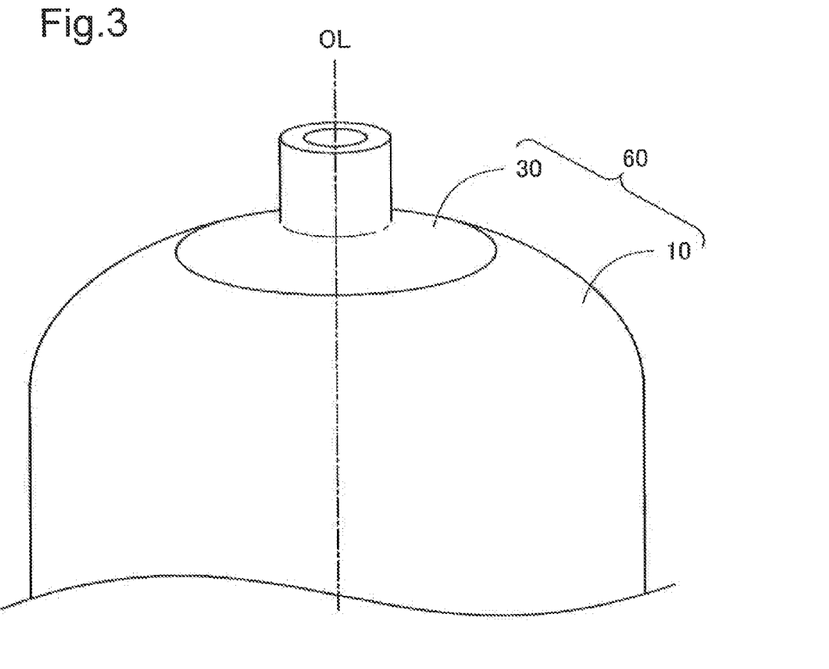
FIG. 3 is a perspective view illustrating part of the appearance configuration of the tank main body.

FIG. 3 is a perspective view illustrating part of the appearance configuration of the tank main body 60. As shown in FIG. 3, the mouthpiece 30 is provided on one end of the liner 10 to have its own central axis aligned with a central axis OL of the liner 10. According to this embodiment, the mouthpiece 30 is mounted to the liner 10 by insert molding. The mouthpiece 30 may, however, be mounted to the liner 10 by another technique, for example, by forming the liner 10 by injection molding and inserting the mouthpiece 30. Hereinafter the central axis of the mouthpiece 30 is also expressed as "central axis OL".

Figure 4:
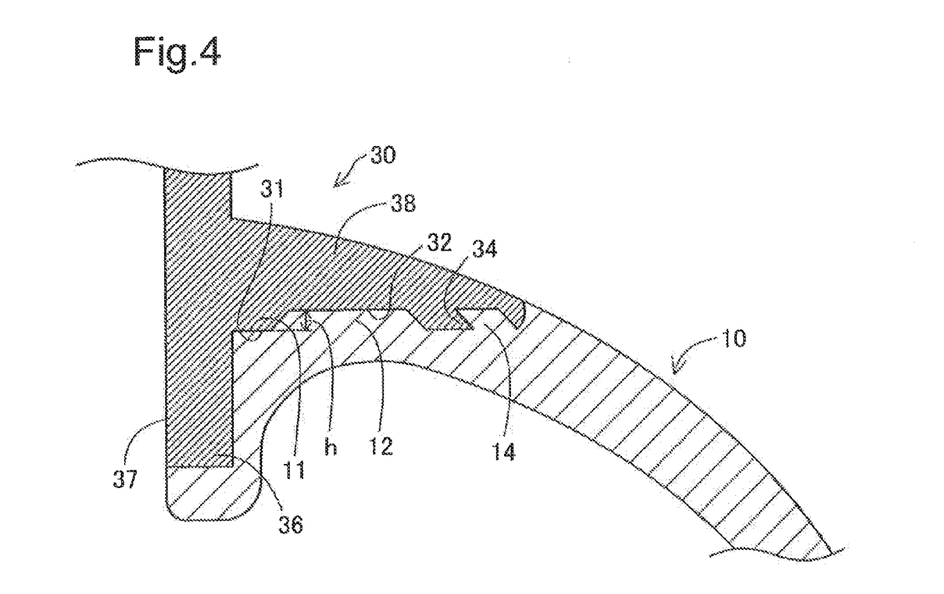
FIG. 4 is an enlarged sectional view schematically illustrating an X1 region in FIG. 1.
Figure 5:
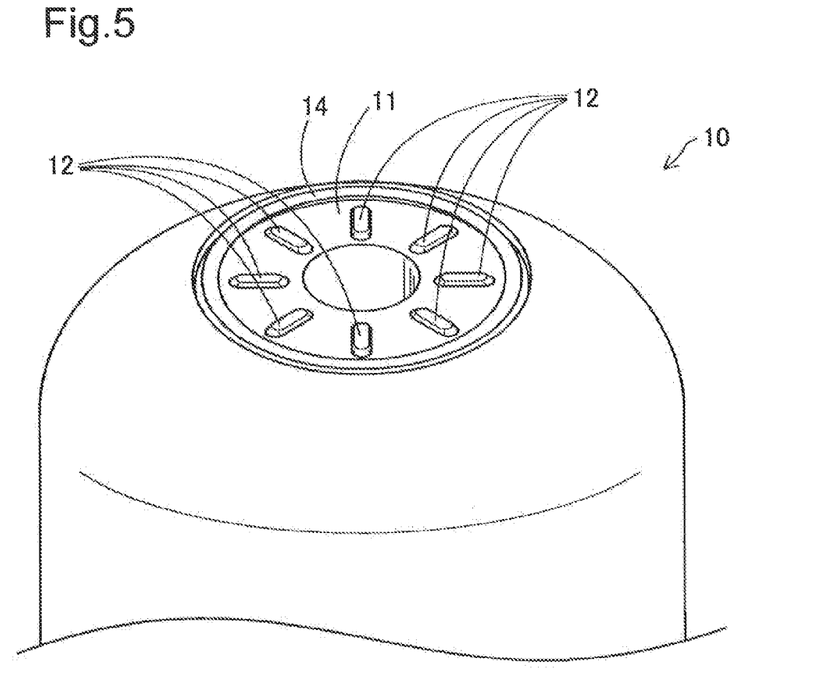
FIG. 5 is a perspective view illustrating the schematic configuration of a first contact surface of a liner.

FIG. 4 is an enlarged sectional view schematically illustrating an X1 region in FIG. 1. As shown in FIG. 4, the liner 10 has a first contact surface 11 arranged to come into contact with the flange portion 38 of the mouthpiece 30. The first contact surface 11 is approximately perpendicular to the central axis OL of the liner 10. FIG. 5 is a perspective view illustrating the schematic configuration of the first contact surface 11 of the liner 10. As shown in FIGS. 4 and 5, the first contact surface 11 of the liner 10 has eight projections 12 of an approximately rectangular shape (chamfered rectangular shape) in plan view to be arranged radially about the central axis OL of the liner 10 as the center. Each of the projections 12 is formed in a tapered approximately trapezoidal sectional shape as shown in FIG. 4. According to this embodiment, the projections 12 are formed at a height h=2 mm. The height h is, however, not limited to this value of the embodiment but may be appropriately set to be, for example, 1 mm, 3 mm or 5 mm, according to, for example, the dimensions of the high pressure tank 100, the torque induced by the rotation of the tank main body 60 and the configuration of the projections 12.

The first contact surface 11 also has a first engagement element 14 of an approximately circular shape (ring shape) in plan view to be placed on the outer side of the projections 12 about the central axis OL of the liner 10 as the center. As shown in FIG. 4, the first engagement element 14 is formed as a convex inclined from its base to its end toward the central axis OL.

Figure 6:
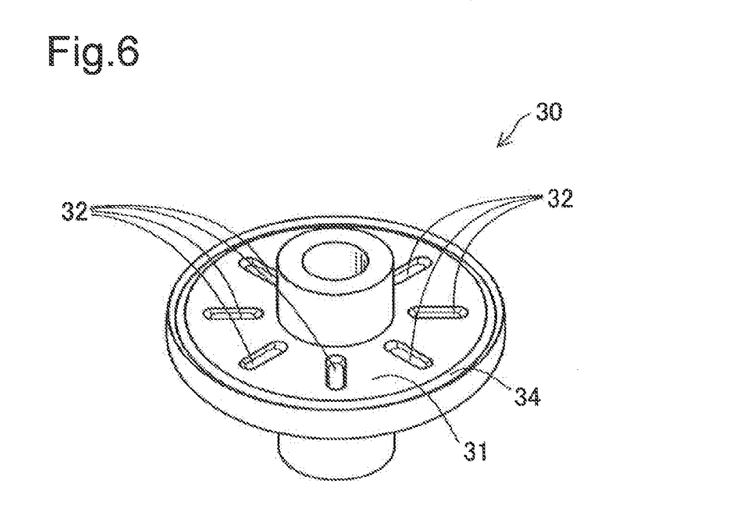
FIG. 6 is a perspective view illustrating the schematic configuration of a second contact surface of a mouthpiece.

As shown in FIG. 4, the mouthpiece 30 has a second contact surface 31 arranged to come into contact with the liner 10. FIG. 6 is a perspective view illustrating the schematic configuration of the second contact surface 31 of the mouthpiece 30. In order to illustrate the second contact surface 31, the mouthpiece 30 of FIG. 6 is vertically inverted from the state of FIG. 4. As shown in FIGS. 4 and 6, the second contact surface 31 of the mouthpiece 30 has eight recesses 32 radially arranged about the central axis OL of the mouthpiece 30 as the center to receive therein the corresponding projections 12 provided on the first contact surface 11 of the liner 10.

The second contact surface 31 also has a second engagement element 34 of an approximately circular shape (ring shape) in plan view to be placed on the outer side of the recesses 32 about the central axis OL of the mouthpiece 30 as the center. As shown in FIG. 4, the second engagement element 34 is engaged with the first engagement element 14 of the liner 10. The second engagement element 34 is provided on the second contact surface 31 of the mouthpiece 30 by forming a groove to receive the first engagement element 14 of the liner 10 fit therein.

A2. Advantageous Effects of First Embodiment

In the high pressure tank 100 of the first embodiment, the mouthpiece 30 includes the flange portion 38 formed in the circular shape. Compared with a mouthpiece having a flange portion formed in a splined shape, a serrate shape or a polygonal shape, this configuration provides a shorter boundary between the liner 10 and the mouthpiece 30. Accordingly, this configuration suppresses distortion of the reinforcement layer 20 even when a variation in internal pressure of the high pressure tank 10 applies a stress to the reinforcement layer 20 on the boundary between the mouthpiece 30 and the liner 10.

As described above, in the process of forming the reinforcement layer 20 by the FW method around the tank main body 60 as the mandrel which is the liner 10 equipped with the mouthpieces 30 and 40, the tank main body 60 is rotated with the mouthpiece 30 of the tank main body 60 fixed to the FW device 200 as shown in FIG. 2. The mouthpiece 30 is fixed to the first rotating shaft 212 of the FW device 200 and is rotated with rotation of the first rotating shaft 212, so that the liner 10 is rotated with rotation of the mouthpiece 30. In the high pressure tank 100 of the first embodiment, the projections 12 are formed on the first contact surface 11 of the liner 10, and the recesses 32 are formed on the second contact surface 31 of the mouthpiece 30 to receive the corresponding projections 12 fit therein. Even when the mouthpiece 30 is rotated at high speed, fitting the projections 12 in the recesses 32 suppresses idle rotation of the mouthpiece 30. In the high pressure tank 100 of the first embodiment, the projections 12 of the approximately rectangular shape (chamfered rectangular shape) in plan view arranged radially about the central axis OL of the liner 10 as the center. In the process of forming the reinforcement layer 20 by the FW method, the torque induced by the rotation of the mouthpiece 30 is orthogonal to the projections 12. This configuration more effectively suppresses the idle rotation of the mouthpiece 30.

Additionally, in the high pressure tank 100, the liner 10 has the first engagement element 14, and the mouthpiece 30 has the second engagement element 34. As described above, in the process of forming the reinforcement layer 20 by the FW method, a torque is induced by the rotation of the tank main body 60 and is applied to the tank main body 60. Each of the projections 12 is formed in the tapered shape toward its end. The torque applied to the tank main body 60 is thus likely to distort the end shape of the projection 12 toward its base and separate the mouthpiece 30 from the liner 10. Engagement between the first engagement element 14 and the second engagement element 34, however, suppresses such separation between the mouthpiece 30 and the liner 10 and further suppresses the idle rotation of the mouthpiece 30. The first engagement element 14 and the second engagement element 34 are formed in the approximately circular shape in plan view to be placed on the outer circumferential side of the projections 12. This configuration uniformly and sufficiently suppresses separation between the liner 10 and the mouthpiece 30 and thus more effectively suppresses the idle rotation of the mouthpiece 30.

The following describes high pressure tanks according to second to fourth embodiments with reference to FIGS. 7 to 12. The high pressure tanks of the second to the fourth embodiments differ from the high pressure tank of the first embodiment by the configuration of the first contact surface of the liner arranged to come into contact with the mouthpiece and the configuration of the second contact surface of the mouthpiece arranged to come into contact with the liner, but otherwise have similar configurations to that of the first embodiment. The following thus mainly describes only the configuration of the liner and the mouthpiece.

B. Second Embodiment

Figure 7:
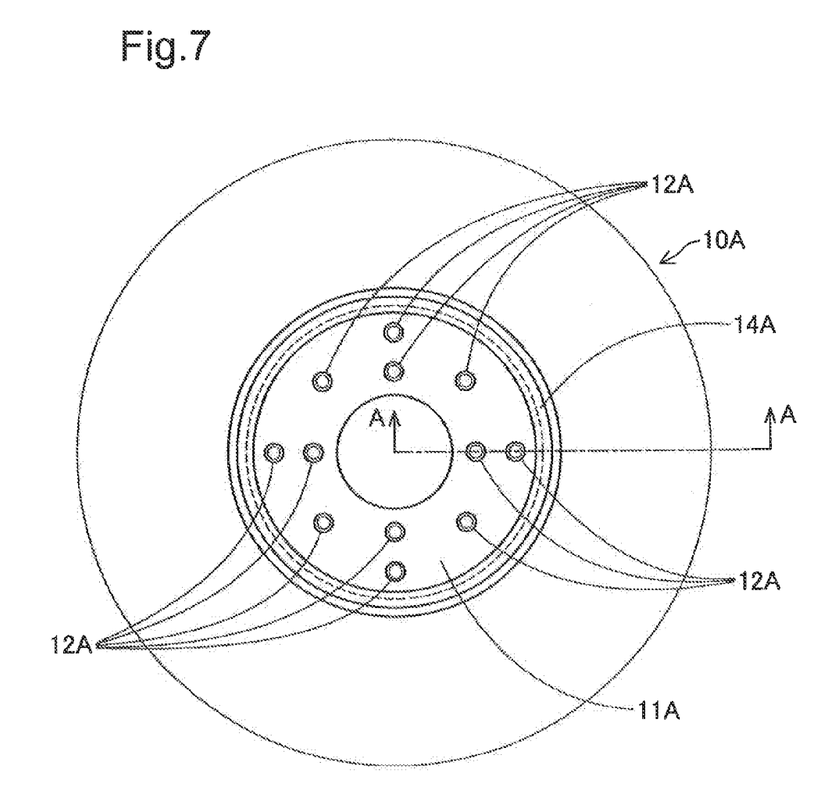
FIG. 7 is a plan view illustrating the schematic configuration of a first contact surface of a liner according to a second embodiment.
Figure 8:
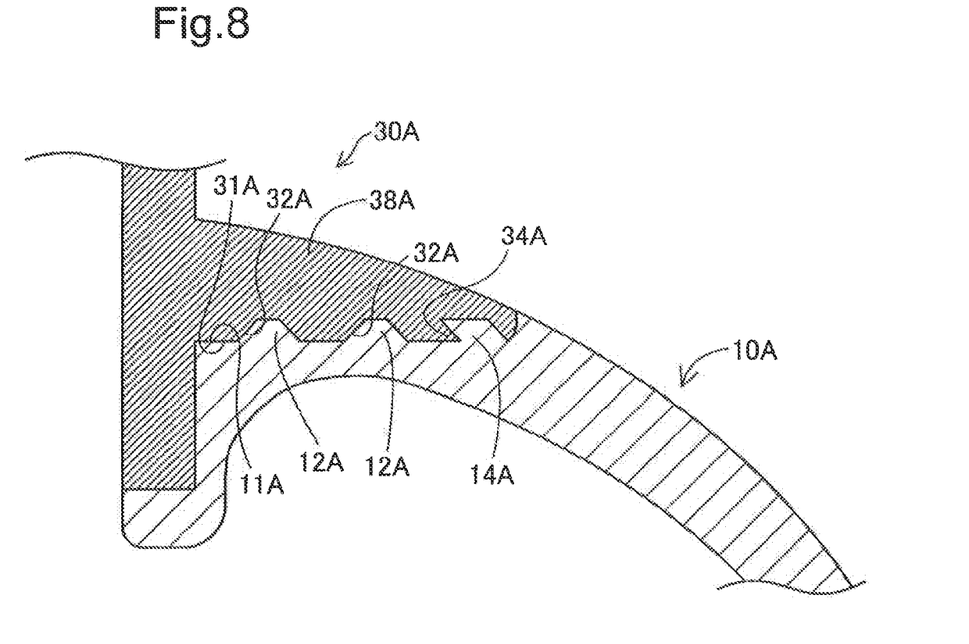
FIG. 8 is an enlarged sectional view illustrating a tank main body of the second embodiment taken on an A-A section in FIG. 7.

FIG. 7 is a plan view illustrating the schematic configuration of a first contact surface 11A of a liner 10A according to a second embodiment. FIG. 8 is an enlarged sectional view illustrating a tank main body of the second embodiment taken on an A-A section in FIG. 7. FIG. 8 corresponds to the enlarged sectional view of FIG. 4 according to the first embodiment illustrating the X1 region of FIG. 1.

As shown in FIGS. 7 and 8, the first contact surface 11A of the liner 10A has twelve projections 12A in an approximately truncated cone shape. The first contact surface 11A also has a first engagement element 14A of an approximately circular shape (ring shape) in plan view to be placed on the other side of the projections 12A about the central axis OL of the liner 10A as the center. The first engagement element 14A of the second embodiment is formed in a similar shape to that of the first engagement element 14 of the first embodiment.

As shown in FIG. 8, a second contact surface 31A of a mouthpiece 30A includes twelve recesses 32A formed to receive therein the corresponding projections 12A provided on the first contact surface 11A of the liner 10A. The second contact surface 31A also includes a second engagement element 34A of an approximately circular shape (ring shape) in plan view to be placed on the outer side of the recesses 32A about the central axis OL of the mouthpiece 30A as the center. The second engagement element 34A of the second embodiment is formed in a similar shape to that of the second engagement element 34 of the first embodiment.

In the high pressure tank of the second embodiment, in the process of forming a reinforcement layer by the FW method, the projections 12A are fit in the corresponding recesses 32A, and additionally the first engagement element 14A is engaged with the second engagement element 34A. This configuration suppresses idle rotation of the mouthpiece 30A. Accordingly, the projections 12A formed in the truncated cone shape ensure the similar advantageous effects to those of the first embodiment. The configuration and the arrangement of the projections 12 described in the first embodiment, however more effectively suppress idle rotation of the mouthpiece 30 as described above and thereby more preferable.

C. Third Embodiment

Figure 9:
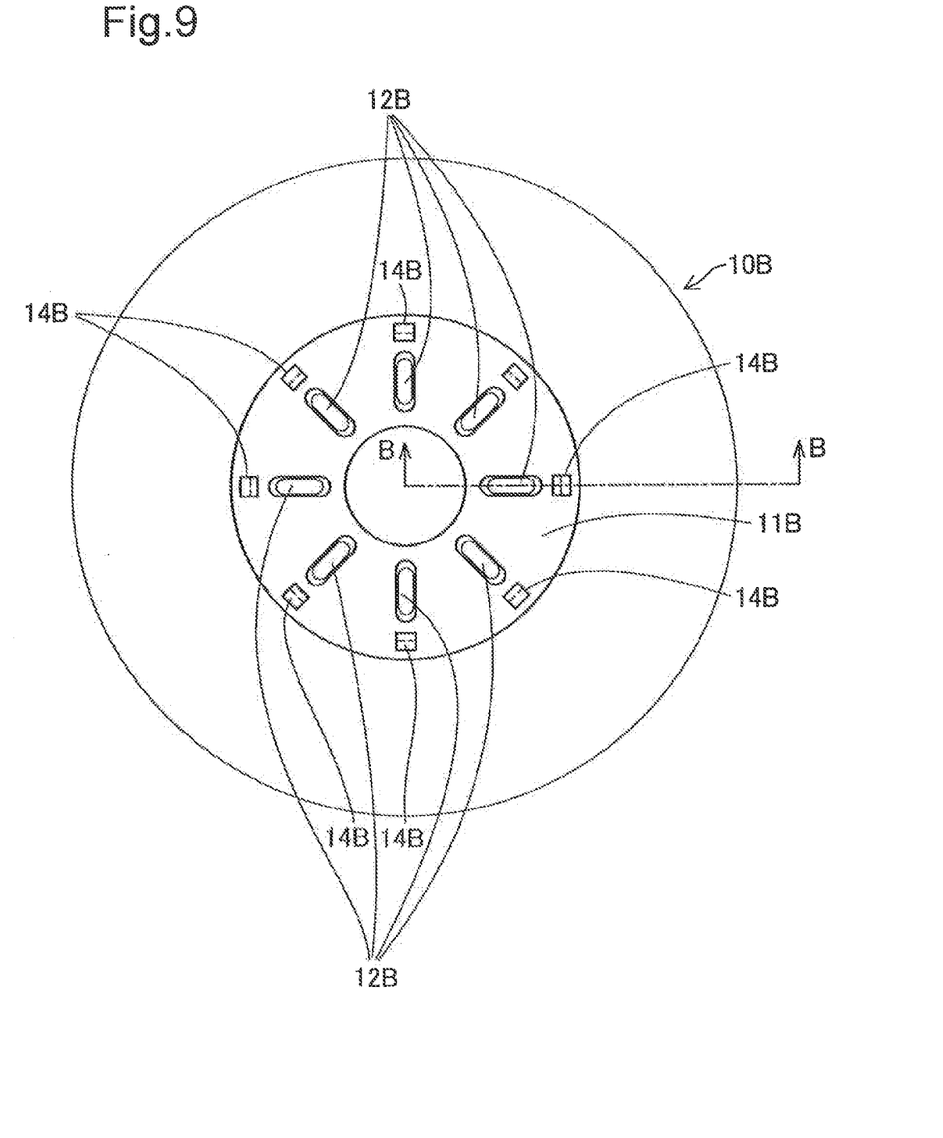
FIG. 9 is a plan view illustrating the schematic configuration of a first contact surface of a liner according to a third embodiment.
Figure 10:
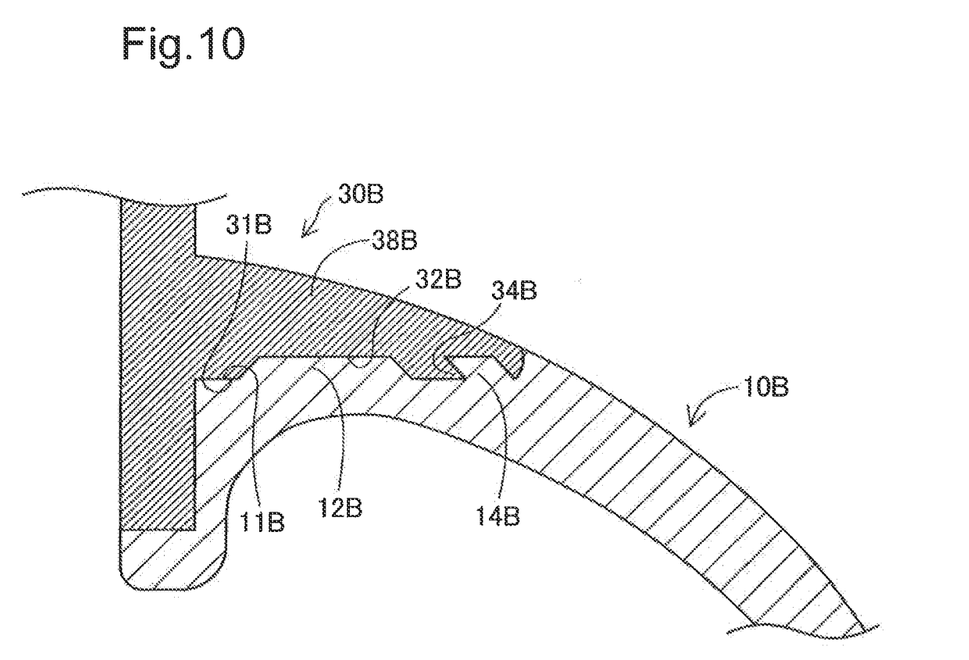
FIG. 10 is an enlarged sectional view illustrating a tank main body of the third embodiment taken on a B-B section in FIG. 9.

FIG. 9 is a plan view illustrating the schematic configuration of a first contact surface 11B of a liner 10B according to a third embodiment. FIG. 10 is an enlarged sectional view illustrating a tank main body of the third embodiment taken on a B-B section in FIG. 9. FIG. 10 corresponds to the enlarged sectional view of FIG. 4 according to the first embodiment illustrating the X1 region of FIG. 1.

As shown in FIGS. 9 and 10, the first contact surface 11B of the liner 10B has eight projections 12B of an approximately rectangular shape (chamfered rectangular shape) in plan view to be arranged radially about the central axis OL of the liner 10B as the center. In other words, the projections 12B are formed in the same configuration and arrangement as those of the first embodiment. The first contact surface 11B also has eight first engagement elements 14B. Each of the first engagement elements 14B is formed in an approximately rectangular shape in plan view (as shown in FIG. 9) as a convex inclined from its base to its end toward the central axis OL (as shown in FIG. 10). The first engagement elements 14B are arranged on the outer side of the projections 12B at positions corresponding to the positions of the projections 12B about the central axis OL of the liner 10B as the center.

As shown in FIG. 10, a second contact surface 31B of a mouthpiece 30B includes eight recesses 32B formed to receive therein the corresponding projections 12B provided on the first contact surface 11B of the liner 10B. The second contact surface 31B also includes eight second engagement elements 34B formed on the outer side of the recesses 32B about the central axis OL of the mouthpiece 30B as the center. The second engagement elements 34B are respectively engaged with the corresponding first engagement elements 14B of the liner 10B.

In the high pressure tank of the third embodiment, in the process of forming a reinforcement layer by the FW method, the projections 12B are fit in the corresponding recesses 32B, and additionally the first engagement elements 14B are respectively engaged with the corresponding second engagement elements 34B. This configuration suppresses idle rotation of the mouthpiece 30B. In the first embodiment, however, the first engagement element 14 and the second engagement element 34 are formed in approximately circular shape in plan view to be placed on the outer circumferential side of the projections 12. This configuration of the first embodiment uniformly and sufficiently suppresses separation between the liner 10 and the mouthpiece 30 so as to more effectively suppress idle rotation of the mouthpiece 30 and is thus more preferable.

D. Fourth Embodiment

Figure 11:
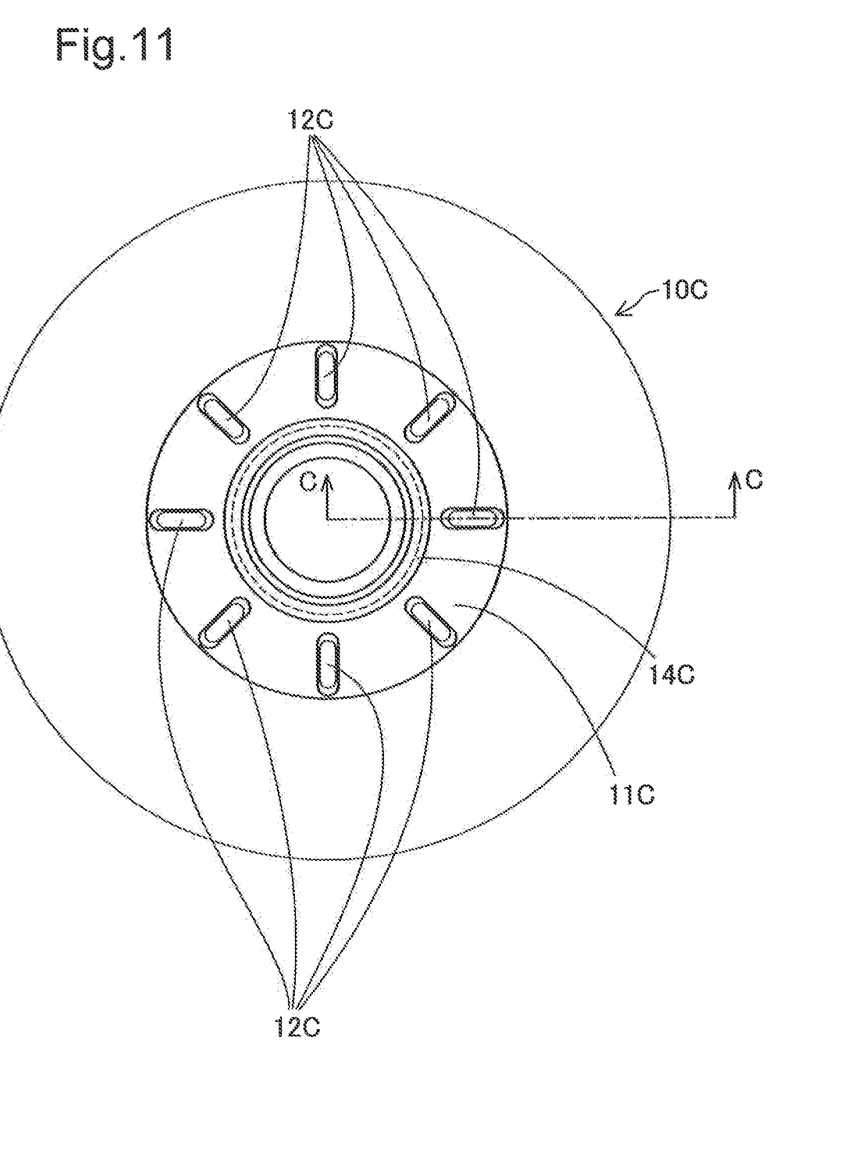
FIG. 11 is a plan view illustrating the schematic configuration of a first contact surface of a liner according to a fourth embodiment.
Figure 12:
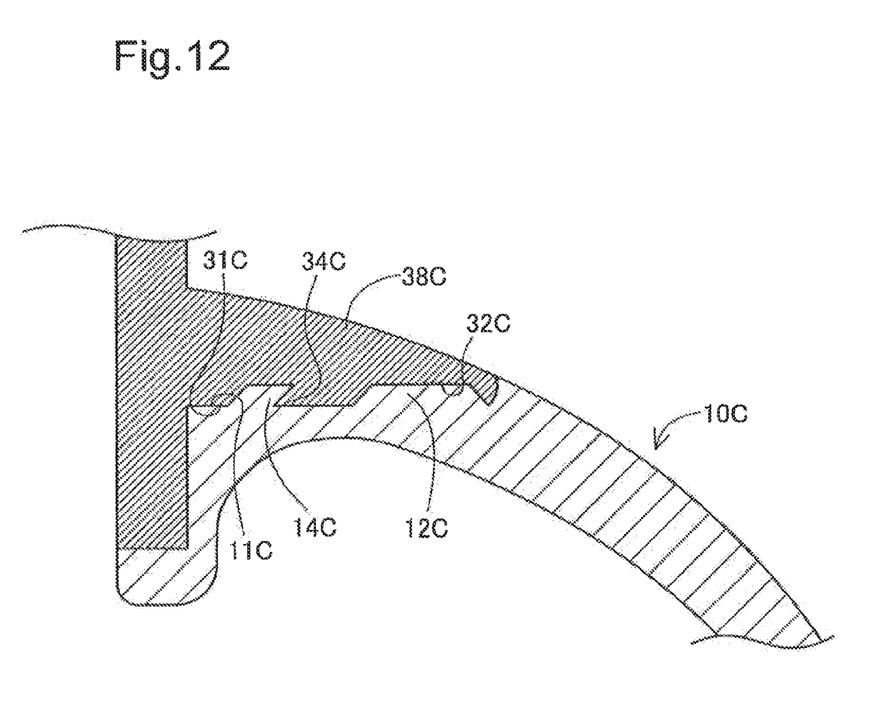
FIG. 12 is an enlarged sectional view illustrating a tank main body of the fourth embodiment taken on a C-C section in FIG. 11.

FIG. 11 is a plan view illustrating the schematic configuration of a first contact surface 11C of a liner 10C according to a fourth embodiment. FIG. 12 is an enlarged sectional view illustrating a tank main body of the fourth embodiment taken on a C-C section in FIG. 11. FIG. 12 corresponds to the enlarged sectional view of FIG. 4 according to the first embodiment illustrating the X1 region of FIG. 1.

As shown in FIGS. 11 and 12, the first contact surface 11C of the liner 10C has eight projections 12C of an approximately rectangular shape (chamfered rectangular shape) in plan view to be arranged radially about the central axis OL of the liner 10C as the center. In other words, the projections 12C are formed in the same configuration and arrangement as those of the first embodiment. The first contact surface 11C also has a first engagement element of an approximately circular shape (ring shape) in plan view on the inner side of the projections 12C about the central axis OL of the liner 10C as the center. According to the fourth embodiment, the first engagement element 14C is formed as a convex inclined from its base to its end radially outward from the central axis OL as shown in FIG. 12.

As shown in FIG. 12, a second contact surface 31C of a mouthpiece 30C includes eight recesses 32C formed to receive therein the corresponding projections 12C provided on the first contact surface 11C of the liner 10C. The second contact surface 31C also includes a second engagement element 34C formed on the inner side of the recesses 32C about the central axis OL of the mouthpiece 30C as the center. The second engagement element 34C is engaged with the first engagement element 14C of the liner 10C.

In the high pressure tank of the fourth embodiment, in the process of forming a reinforcement layer by the FW method, the projections 12C are fit in the corresponding recesses 32C, and additionally the first engagement element 14C is engaged with the second engagement element 34C. This configuration suppresses idle rotation of the mouthpiece 30C. In the first embodiment, however, the first engagement element 14 and the second engagement element 34 are formed in approximately circular shape in plan view to be placed on the outer circumferential side of the projections 12. This configuration of the first embodiment suppresses separation between the liner 10 and the mouthpiece 30 by the longer distance than that of the fourth embodiment so as to more effectively suppress idle rotation of the mouthpiece 30 and is thus more preferable.

E. Modifications

The invention is not limited to the embodiments described above but may be implemented by a diversity of other aspects without departing from the scope of the invention. Some examples of possible modifications are given below.

(1) In the embodiments described above, the first contact surface of the liner has the projections and the first engagement element(s), and the second contact surface of the mouthpiece has the recesses and the second engagement element(s). The first engagement element and the second engagement element may, however, be omitted appropriately. Even in this modified configuration, in the process of forming a reinforcement layer by the FW method, fitting the projections in the recesses suppresses idle rotation of the mouthpiece. The projections and the recesses may be formed in such shapes as to additionally serve as the first engagement element and the second engagement element and engage the liner and the mouthpiece with each other. This modified configuration also suppresses separation between the mouthpiece and the liner by the torque induced by the rotation of the tank main body and applied to the tank main boy, thus suppressing idle rotation of the mouthpiece.

(2) The first contact surface of the liner has the projections in the above embodiments, but the second contact surface of the mouthpiece may alternatively have projections. In the configuration that the mouthpiece has the projections, the liner is configured to include recesses formed to receive the projections of the mouthpiece fit therein. This modified configuration has similar advantageous effects to those of the above embodiments. Forming the projections on the liner, however, facilitates manufacture compared with forming the projections on the mouthpiece and is thus more preferable.

(3) The shapes and the numbers of the projections, the recesses, the first engagement elements and the second engagement elements are not limited to those described in the above embodiments. For example, each of the projections 12 of the first embodiment may be cut into a plurality of pieces. In another embodiment, the first engagement element 14 of the first embodiment may be cut into a plurality of pieces to be separated arc shapes in plan view. The number of the projections, the recesses, the first engagement elements or the second engagement elements needs to be at least one. For example, both the first engagement element 14 of the first embodiment and the first engagement element 14C of the fourth embodiment may be provided as first engagement elements.

(4) In the embodiment described above, nylon is used for the material of the liner 10, aluminum is used for the material of the mouthpieces 30 and 40, and the fiber reinforced plastic or more specifically CFRP including the carbon fibers and the epoxy resin is used for the material of the reinforcement layer 20. These materials are, however, not restrictive. For example, a polyethylene resin, a polypropylene resin or another hard resin may be used for the material of the liner 10. For example, stainless steel, an aluminum alloy, or another metal or alloy may be used for the material of the mouthpieces 30 and 40. The fiber reinforced plastic may include, for example, a modified epoxy resin or an unsaturated polyester resin as the resin and for example, metal fibers as the reinforcing fibers.

(5) In the embodiment described above, the liner 10 is configured not to cover the outer surface of the flange portion 38 of the mouthpiece 30, and the reinforcement layer 20 is formed to cover the outer surface of the flange portion 38. The configuration of the liner 10 is, however, not limited to that of the above embodiment. According to another embodiment, the liner 10 may be configured to cover the entire outer surface of the flange portion 38 of the mouthpiece 30. In this modified configuration, the reinforcement layer 20 may be formed to cover the entire outer surface of the liner 10 and thereby cover over the boundary between the liner 10 and the mouthpiece 30 across the liner 10 such that the reinforcement layer 20 is not in contact with the flange portion 38 of the mouthpiece 30. According to another embodiment, the liner 10 may be configured to cover a peripheral part of the outer surface of the flange portion 38 of the mouthpiece 30. In this modified configuration, the reinforcement layer 20 may be formed to cover the entire outer surface of the liner 10 and the outer surface of the flange portion 38 of the mouthpiece 30 and thereby cover over the boundary between the liner 10 and the mouthpiece 30 across the liner 10. The configuration of covering at least the entire outer surface of the liner and covering over the boundary between the liner and the mouthpiece is expressed as the configuration of "covering the entire tank main body" in the claims. This configuration includes, for example, the configuration that the reinforcement layer 20 is formed to cover neither part of the outer surface of the cylindrical body 36 of the mouthpiece 30 nor part of the outer surface of the flange portion 38 of the mouthpiece 30.

(6) In the embodiment described above, the projections 12 and the first engagement element 14 are formed on the first contact surface 11 of the liner 10 arranged to come into contact with the mouthpiece 30, and the recesses 32 and the second engagement element 34 are formed on the second contact surface 31 of the mouthpiece 30. According to another embodiment, these components may be provided on the mouthpiece 40-side. More specifically, projections and a first engagement element may be provided on a first contact surface of the liner 10 arranged to come into contact with the mouthpiece 40, and recesses and a second engagement element may be provided on a second contact surface of the mouthpiece 40 arranged to come into contact with the liner 10. According to another embodiment, these components may be provided on both the mouthpiece 30-side and the mouthpiece 40-side. In the process of forming a reinforcement layer by the FW method, providing projections and recesses on at least the side of the mouthpiece fixed to the FW device to rotate suppresses idle rotation of the mouthpiece. The above embodiment describes the high pressure tank 100 equipped with the mouthpieces 30 and 40. The high pressure tank may, however, be equipped with at least one mouthpiece that serves as an opening of the high pressure tank and has a through hole for the flow of a fluid contained in the high pressure tank. For example, the high pressure tank may not have the mouthpiece 40.

(7) The fluid contained in the high pressure tank 100 is not limited to the compressed hydrogen in the above embodiment but may be any high pressure fluid such as compressed nitrogen.

The present application claims priority from Japanese patent application (application number 2014-188816) under the title of invention of "high pressure tank" filed on Sep. 17, 2014, the entirety of the disclosure of which is hereby incorporated by reference into this application.

What is claimed is:

1. A high pressure tank, comprising:
a tank main body including a liner made of a resin, and a mouthpiece made of a non-resin material and mounted to an open end of the liner; and
a reinforcement layer covering the entire tank main body and having pressure resistance, wherein
the liner includes a first contact surface arranged approximately perpendicular to a central axis of the liner to come into contact with the mouthpiece,
the central axis of the liner is the longitudinal axis extending between a first end of the liner and a second end of the liner,
the mouthpiece includes a second contact surface arranged to come into contact with the first contact surface of the liner,
one of the first contact surface and the second contact surface includes projections, and the other includes recesses in which the projections being fitted, and
the second contact surface is formed in an approximately circular shape.

2. The high pressure tank according to claim 1, wherein the projections are formed radially about a central axis of the high pressure tank as a center.

3. The high pressure tank according to claim 1, wherein the projections are formed on the first contact surface of the liner.

4. The high pressure tank according to claim 2, wherein the projections are formed on the first contact surface of the liner.

5. The high pressure tank according to claim 1, wherein the first contact surface and the second contact surface respectively include a first engagement element and a second engagement element configured to be engaged with each other and suppress separation between the mouthpiece and the liner.

6. The high pressure tank according to claim 5, wherein the first engagement element and the second engagement element are formed in an approximately circular shape in plain view to be placed on an outer circumferential side of the projections.

7. The high pressure tank according to claim 2, wherein the first contact surface and the second contact surface respectively include a first engagement element and a second engagement element configured to be engaged with each other and suppress separation between the mouthpiece and the liner.

8. The high pressure tank according to claim 7, wherein the first engagement element and the second engagement element are formed in an approximately circular shape in plain view to be placed on an outer circumferential side of the projections.

9. The high pressure tank according to claim 3, wherein the first contact surface and the second contact surface respectively include a first engagement element and a second engagement element configured to be engaged with each other and suppress separation between the mouthpiece and the liner.

10. The high pressure tank according to claim 9, wherein the first engagement element and the second engagement element are formed in an approximately circular shape in plain view to be placed on an outer circumferential side of the projections.

11. The high pressure tank according to claim 4, wherein the first contact surface and the second contact surface respectively include a first engagement element and a second engagement element configured to be engaged with each other and suppress separation between the mouthpiece and the liner.

12. The high pressure tank according to claim 11, wherein the first engagement element and the second engagement element are formed in an approximately circular shape in plain view to be placed on an outer circumferential side of the projections.

* * * * *